(12) United States Patent
Dudar (10) Patent No.: US 10,093,140 B2
(45) Date of Patent: Oct. 9, 2018

(54) TIRE-DIAGNOSIS SYSTEM

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/438,014

(22) Filed: Feb. 21, 2017

(65) Prior Publication Data

US 2018/0236828 A1    Aug. 23, 2018

(51) Int. Cl.
| | |
|---|---|
| *B60C 23/20* | (2006.01) |
| *G08G 1/00* | (2006.01) |
| *G05D 1/00* | (2006.01) |
| *G01C 21/34* | (2006.01) |
| *G01K 13/00* | (2006.01) |
| *G05D 1/02* | (2006.01) |
| *G07C 5/08* | (2006.01) |

(52) U.S. Cl.
CPC .............. *B60C 23/20* (2013.01); *G01C 21/34* (2013.01); *G01K 13/00* (2013.01); *G05D 1/0088* (2013.01); *G05D 1/0291* (2013.01); *G07C 5/0808* (2013.01); *G08G 1/22* (2013.01); *G05D 2201/0213* (2013.01)

(58) Field of Classification Search
CPC ...... B60C 23/20; G07C 5/0808; G01K 13/00; G05D 1/0088; G05D 1/0291; G05D 2201/0213; G08G 1/22; G01C 21/34
USPC ........................................................ 701/29.2
See application file for complete search history.

(56) References Cited

U.S. PATENT DOCUMENTS

| | | | |
|---|---|---|---|
| 7,075,421 B1* | 7/2006 | Tuttle ...................... | B60C 23/04 152/152.1 |
| 7,944,346 B2 | 5/2011 | De Castro et al. | |
| 8,542,881 B2 | 9/2013 | Teti et al. | |
| 8,547,216 B2* | 10/2013 | Cao .......................... | B60C 23/20 340/425.5 |
| 8,718,870 B2* | 5/2014 | Igarashi .................. | B60C 23/20 180/197 |
| 8,744,666 B2 | 6/2014 | Switkes et al. | |
| 9,091,537 B2 | 7/2015 | Farr et al. | |
| 9,604,508 B2* | 3/2017 | Lesesky .................. | B60C 19/00 |
| 2003/0117275 A1* | 6/2003 | Watkins .................. | B60C 23/20 340/442 |

(Continued)

FOREIGN PATENT DOCUMENTS

| | | |
|---|---|---|
| CN | 104210490 A | 12/2014 |
| DE | 102015012815 A1 | 4/2017 |

(Continued)

OTHER PUBLICATIONS

"Michelin Embeds RFID Tags in Tires", RFID Journal, Jan. 16, 2003-Jan. 17, 2003 (3 pages).
GB Search Report dated Aug. 15, 2018 re GB Appl. No. 1802719.3.

*Primary Examiner* — Tyler J Lee
(74) *Attorney, Agent, or Firm* — Frank A. MacKenzie; Bejin Bieneman PLC (57) ABSTRACT

A computer is programmed to determine that a first vehicle and a second vehicle are in a platoon without an intervening vehicle, receive a thermal image of a tire of the first vehicle from the second vehicle, navigate a route for the first vehicle based upon determining that the thermal image exceeds a threshold.

20 Claims, 6 Drawing Sheets

(56) References Cited

U.S. PATENT DOCUMENTS

| | | | | |
|---|---|---|---|---|
| 2005/0145794 A1* | 7/2005 | Faubion | ................. | B60T 17/22 |
| | | | | 250/330 |
| 2008/0028846 A1 | 2/2008 | Heath et al. | | |
| 2013/0158798 A1* | 6/2013 | Igarashi | ................. | B60C 23/20 |
| | | | | 701/37 |
| 2013/0278771 A1* | 10/2013 | Magoun | ................... | H04N 5/33 |
| | | | | 348/148 |
| 2015/0029016 A1* | 1/2015 | Lesesky | ............... | B60C 23/045 |
| | | | | 340/442 |

FOREIGN PATENT DOCUMENTS

| | | | |
|---|---|---|---|
| FR | 2880975 | | 7/2006 |
| GB | 2559030 A | | 11/2017 |
| JP | 2007-380656 | * | 3/2007 |
| KR | 20140145761 A | * | 12/2014 |
| WO | WO 2016071746 A1 | | 5/2016 |

* cited by examiner

TIRE-DIAGNOSIS SYSTEM

BACKGROUND

A tire-pressure monitoring system (TPMS) is a system for monitoring the air pressure of tires of a vehicle. When the TPMS detects that one of the tires of the vehicle is improperly inflated, an indicator light on the instrument panel illuminates to warn a driver about the tire. TPMS may be indirect or direct.

Indirect TPMS monitors information available outside of the tire to indirectly determine the air pressure. Some indirect TPMS relies on individual rotational speeds of the tires. If one tire is rotating faster than the other tires, then the tire has a smaller diameter and thus is likely underinflated.

Direct TPMS uses pressure sensors mounted either inside or on an outer surface of each tire. Pressure sensors mounted inside the tires communicate using wireless short-range signals.

Neither indirect nor direct TPMS monitors tire wear, and indirect TPMS may not detect if all tires are underinflated rather than only one tire. Direct and indirect TPMS require additional sensors for the vehicle. Determining tire wear by mileage count is often imprecise because not all miles wear down tires equally. Visual inspection of tires can be unreliable and relies on humans to perform the inspection.

DETAILED DESCRIPTION

With reference to the Figures, wherein like numerals indicate like parts throughout the several views, a computer 36 is programmed to determine that a first vehicle 30 and a second vehicle 32 are in a platoon 34 without an intervening vehicle, receive a thermal image of a tire 40 of the first vehicle 30 from the second vehicle 32, and navigate a route for the first vehicle 30 based upon determining that the thermal image exceeds a threshold. (The adjectives "first" and "second" are used throughout this document as identifiers and are not intended to signify importance or order.) The threshold is based on temperature, e.g., a temperature at a point on the tire 40, an average temperature across a series of points on the tire 40, a temperature difference between two points on the tire 40, a temperature gradient in a region of the tire 40, etc.

Determining that the thermal image exceeds the threshold may include determining that an average temperature across a width W of the tire 40 exceeds the threshold.

Determining that the thermal image exceeds the threshold may include determining that a temperature difference between a shoulder 48 and a midpoint 52 along the width W of the tire 40 exceeds the threshold.

The computer 36 may be further programmed to request the thermal image of the tire 40 upon determining that a surrounding environment is at least one of dry and dark.

The computer 36 may be further programmed to request the thermal image of the tire 40 upon determining that the first and second vehicles 30, 32 are traveling on a straight road.

The computer 36 may be further programmed to request the thermal image of the tire 40 upon determining that the tire 40 has reached a plateau pressure.

The computer 36 may be further programmed to request the thermal image of the tire 40 upon receiving a low-pressure warning about the tire 40.

The computer 36 may be further programmed to determine that the tire 40 needs replacing before completing an originally planned route in response to the thermal image exceeding the threshold. Additionally, the computer 36 may be further programmed to transmit a request for a spare tire to nearby vehicles upon determining that the first vehicle 30 lacks a spare tire.

The computer 36 may be further programmed to navigate a route having smoother roads than an originally planned route upon determining that the thermal image exceeds the threshold.

The computer 36 may be further programmed to transmit a request for a change in a relative position within the platoon 34, and upon changing the relative position, request the thermal image of the tire 40.

The computer 36 may be further programmed to instruct a thermographic camera 58 of the first vehicle 30 to take a thermal image of a tire 40 of the second vehicle 32.

The computer 36 may be programmed to identify an apparatus having a thermographic camera 58 facing the tire 40 of the first vehicle 30, request a thermal image of the tire 40 from the apparatus, and navigate a route for the first vehicle 30 upon determining that the thermal image exceeds a threshold.

Determining that the thermal image exceeds the threshold may include determining that an average temperature across the width W of the tire 40 exceeds the threshold.

Determining that the thermal image exceeds the threshold may include determining that a temperature difference between the shoulder 48 and the midpoint 52 along the width W of the tire 40 exceeds the threshold.

A method includes determining that the first vehicle 30 and the second vehicle 32 are in the platoon 34 without an intervening vehicle, receiving a thermal image of the tire 40 of the first vehicle 30 from the second vehicle 32, and navigating a route for the first vehicle 30 upon determining that the thermal image exceeds a threshold.

Determining that the thermal image exceeds the threshold may include determining that an average temperature across the width W of the tire 40 exceeds the threshold.

Determining that the thermal image exceeds the threshold may include determining that a temperature difference between the shoulder 48 and the midpoint 52 along the width W of the tire 40 exceeds the threshold.

The method may also include determining that the tire 40 needs replacing before completing an originally planned route in response to the thermal image exceeding the threshold.

The method may also include navigating a route to having smoother roads than an originally planned route upon determining that the thermal image exceeds the threshold.

Using thermal monitoring of the tires 40 of the first vehicle 30 provides a technical solution to the problem of measuring tire pressure and monitoring operations of the vehicle 30. Thermal monitoring can provide tire monitoring to supplement and/or provide a backup to other ways of monitoring tire pressure. The system can detect worn tires 40 in addition to under- or overinflated tires 40. Thermal monitoring independently monitors each tire 40, unlike indirect TPMS. Thermal monitoring avoids the fallibility of visual inspections and imprecision of mileage counts. The system may reduce accidents and/or blowouts by prompting replacement or proper inflation of the tires 40 before blowouts occur.

For purposes of this disclosure, an autonomous mode is defined as one in which each of a propulsion system, a brake system, and a steering system of the vehicle are controlled by one or more computers; in a semi-autonomous mode computer(s) of the vehicle control(s) one or two of the propulsion, braking, and steering.

Figure 1:
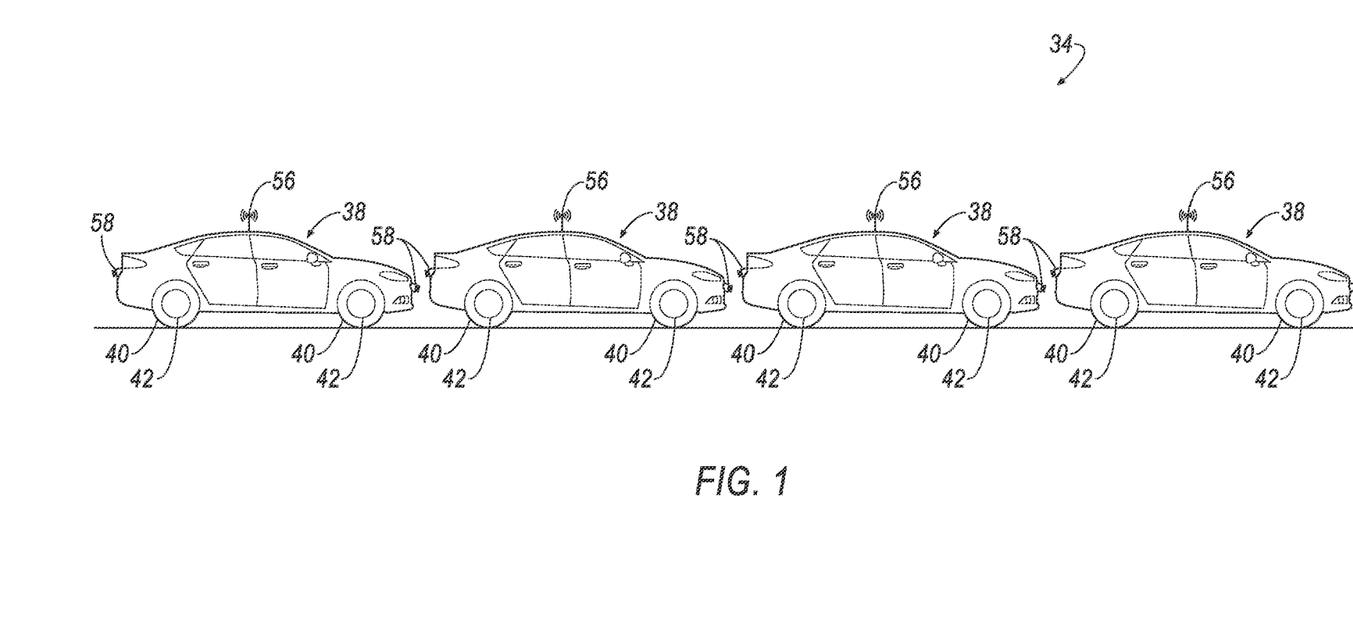
FIG. 1 is a diagram of an exemplary platoon of vehicles.

With reference to FIG. 1, fully autonomous vehicles 30, 32, 38 may be able to operate in a platoon 34. A "platoon" is a group of vehicles 30, 32, 38 that are traveling together in a coordinated manner (e.g., with respect to speed, heading, etc.) and that are equipped to substantially simultaneously brake. The vehicles 30, 32, 38 may be in communication with each other and may coordinate maneuvers besides braking. The communication and coordination of braking allows the vehicles 30, 32, 38 to travel more closely together than vehicles that are not in a platoon 34.

Figure 2:
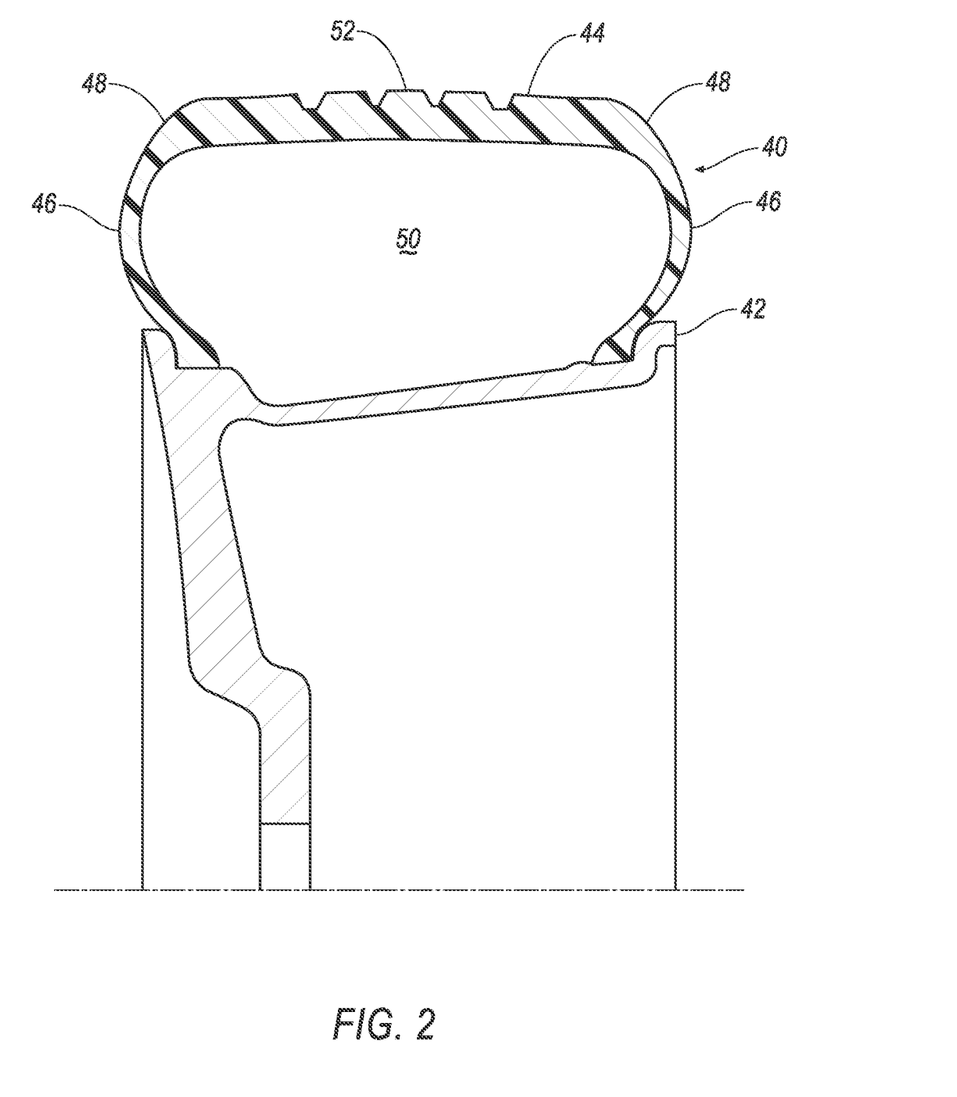
FIG. 2 is a cross-section of a tire and wheel of an exemplary vehicle along line 2-2 in FIG. 1.

With reference to FIG. 2, the tires 40 are inflatable rings mounted to wheels 42 of the vehicles 30, 32, 38. The tires 40 provide shock absorption and traction. Each tire 40 may include a tread 44 and two sidewalls 46. The tread 44 extends between two shoulders 48 and circumferentially about an axis of rotation. Each sidewall 46 extends radially inward from the shoulder 48 to the wheel 42. The tread 44, sidewalls 46, and wheel 42 may define an inflation chamber 50 that may be filled with pressurized inflation medium, such as air.

With use, the tread 44 wears down over time. In other words, material of the tread 44 wears away, and a thickness of the tread 44 decreases. As the tread 44 wears down, the likelihood that the tire 40 develops a leak or rupture increases.

Each tire 40 has a proper inflation pressure, that is, a pressure of the inflation medium in the inflation chamber 50 at which the tread 44 presses against the ground evenly across a width W of the tread 44. If the tire 40 is overinflated, that is, the inflation pressure is too high, the tire 40 presses against the ground more strongly at a midpoint 52 of the width W than at the shoulders 48. The midpoint 52 is a point halfway between the shoulders 48. If the tire 40 is underinflated, that is, the inflation pressure is too low, the tire 40 presses against the ground more strongly at the shoulders 48 than at the midpoint 52.

The tires 40 may be formed of synthetic or natural rubber, or other elastomeric materials that provide sufficient elasticity, durability, and grip. The tires 40 may also include cords (not shown) running through the elastomeric material and/or chemical compounds added to the elastomeric material.

Figure 3:
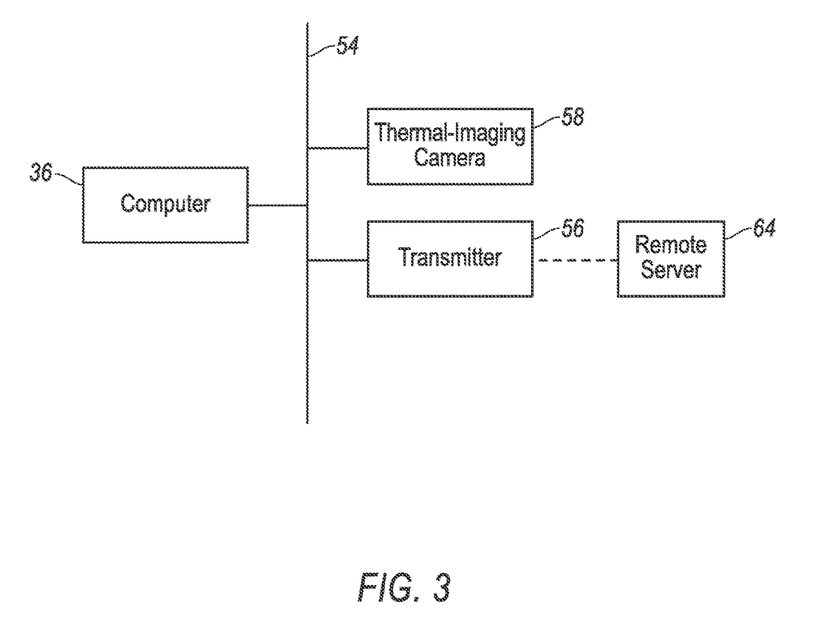
FIG. 3 is a block diagram of the exemplary vehicle of FIG. 1.

With reference to FIG. 3, the computer 36 carries out various operations, including as described herein. The computer 36 is a computing device that generally includes a processor and a memory, the memory including one or more forms of computer-readable media, and storing instructions executable by the processor for performing various operations, including as disclosed herein. The memory of the computer 36 further generally stores remote data received via various communications mechanisms, such as through a communications network 54. The computer 36 may also have a connection to an onboard diagnostics connector (OBD-II). Although one computer 36 is shown in FIG. 2 for ease of illustration, it is to be understood that the computer 36 could include, and various operations described herein could be carried out by, one or more computing devices.

The computer 36 may be located in the first vehicle 30, as shown in FIG. 3; may be remote from the first vehicle 30; or may be split between the first vehicle 30 and a remote location. If the computer 36 is located in the first vehicle 30, the computer 36 may also control operations of the vehicle 30 including semi-autonomous or autonomous operation of the first vehicle 30, or the computer 36 may be a separate computer 36 from the computer controlling or directing operations. If the computer 36 is remote from the first vehicle 30, the computer 36 may be in communication with the first vehicle 30 via, e.g., a cloud-based service.

The computer 36 may transmit signals through the communications network 54 of the vehicle 30 such as a controller area network (CAN) bus, Ethernet, Local Interconnect Network (LIN), and/or by any other wired or wireless communications network. The computer 36 may be in communication with a transmitter 56 and/or a thermographic camera 58.

With continued reference to FIG. 3, the transmitter 56 may be connected to the communications network 54. The transmitter 56 may be adapted to transmit signals wirelessly through any suitable wireless communication protocol, such as Bluetooth, WiFi, 802.11a/b/g, radio, etc. The transmitter 56 may be adapted to communicate with a remote server 64, that is, a server distinct and spaced from the vehicle. The remote server 64 may be located outside the vehicle. For example, the remote server 64 may be associated with the other vehicles 32, 38 (e.g., V2V communications), infrastructure components (e.g., V2I communications), emergency responders, mobile devices associated with the owner of the vehicle, etc. For example, the transmitter 56 of the first vehicle 30 may be able to communicate with the second vehicle 32, with a drone 60, or with an infrastructure component such as a stoplight 62, as shown in FIG. 4.

Figure 4:
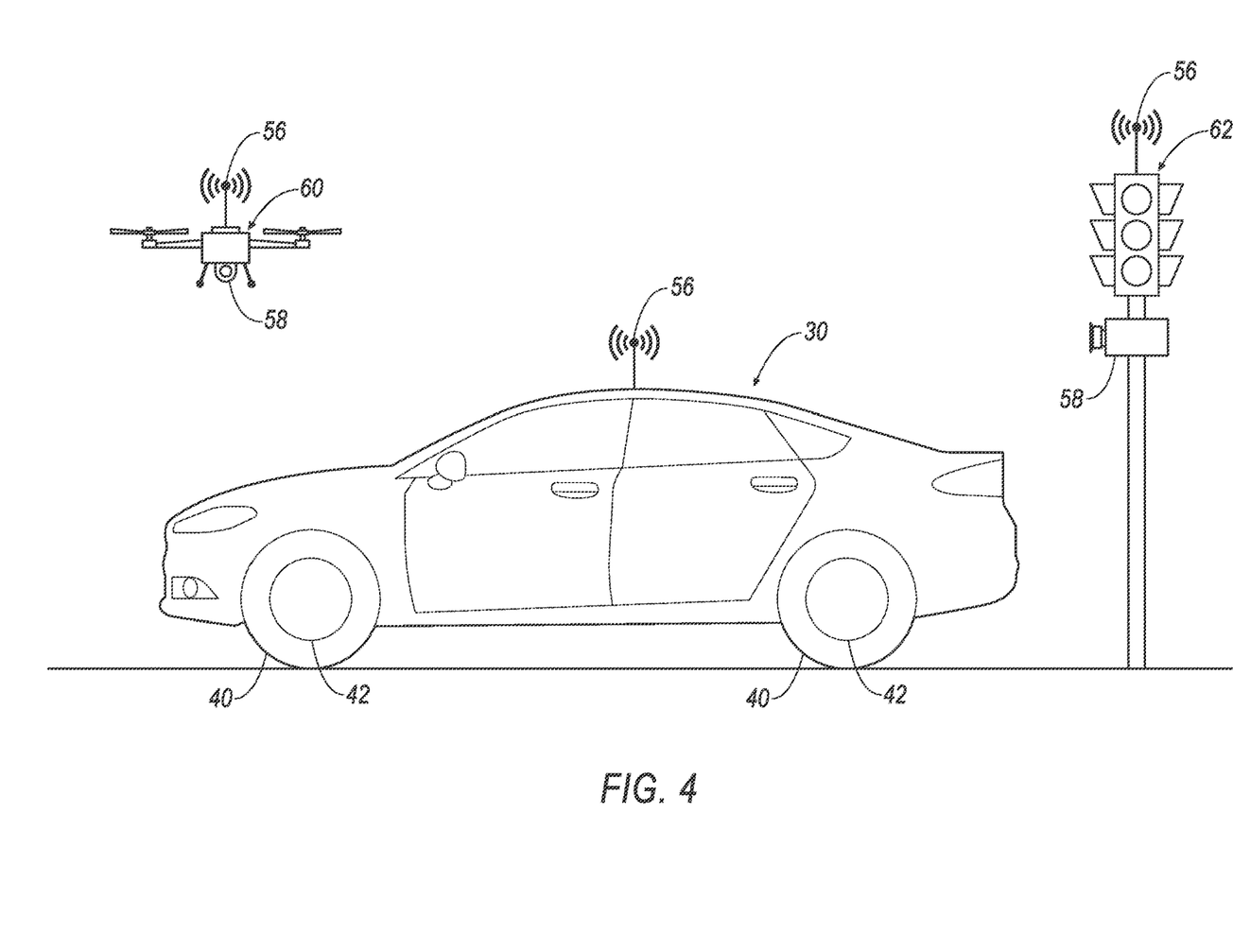
FIG. 4 is a diagram of a network involving the exemplary vehicle of FIG. 1.

With reference to FIGS. 1, 3, and 4, the thermographic camera 58 may be positioned on one of the vehicles 30, 32, 38 facing in a vehicle-forward or vehicle-rearward direction. The vehicles 30, 32, 38 may each have multiple thermographic cameras 58, for example, a thermographic camera 58 facing in a vehicle-forward direction and another thermographic camera 58 facing in a vehicle-rearward direction. Thermographic cameras may also be located on drones 60 or infrastructure components.

The thermographic camera 58 is a device that forms images using infrared radiation. Infrared radiation is electromagnetic radiation having a wavelength in the range of approximately 700 nanometers to 1 millimeter. The thermographic camera 58 may be able to detect and form images based on all or a portion of that range.

With reference to FIG. 4, the drone 60 may be in communication with the first vehicle 30 via the transmitter 56. The drone 60 is an unmanned aerial vehicle, such as a quadcopter. The drone 60 may be equipped with a thermographic camera 58. The drone 60 may be launched from the first vehicle 30, some other vehicle, or a remote site, e.g., in a geographic area in which the vehicle 30 is traveling.

The first vehicle 30 may also be in communication with an infrastructure component via the transmitter 56. "Infrastructure," as that term is used herein, means one or more components fixed to an environment surrounding the first vehicle 30. That is, infrastructure components are intended to stay in one location and typically do not move. For example, the stoplight 62 is a component of the infrastructure. The stoplight 62 or other such component may be equipped with a thermographic camera 58.

Figure 5:
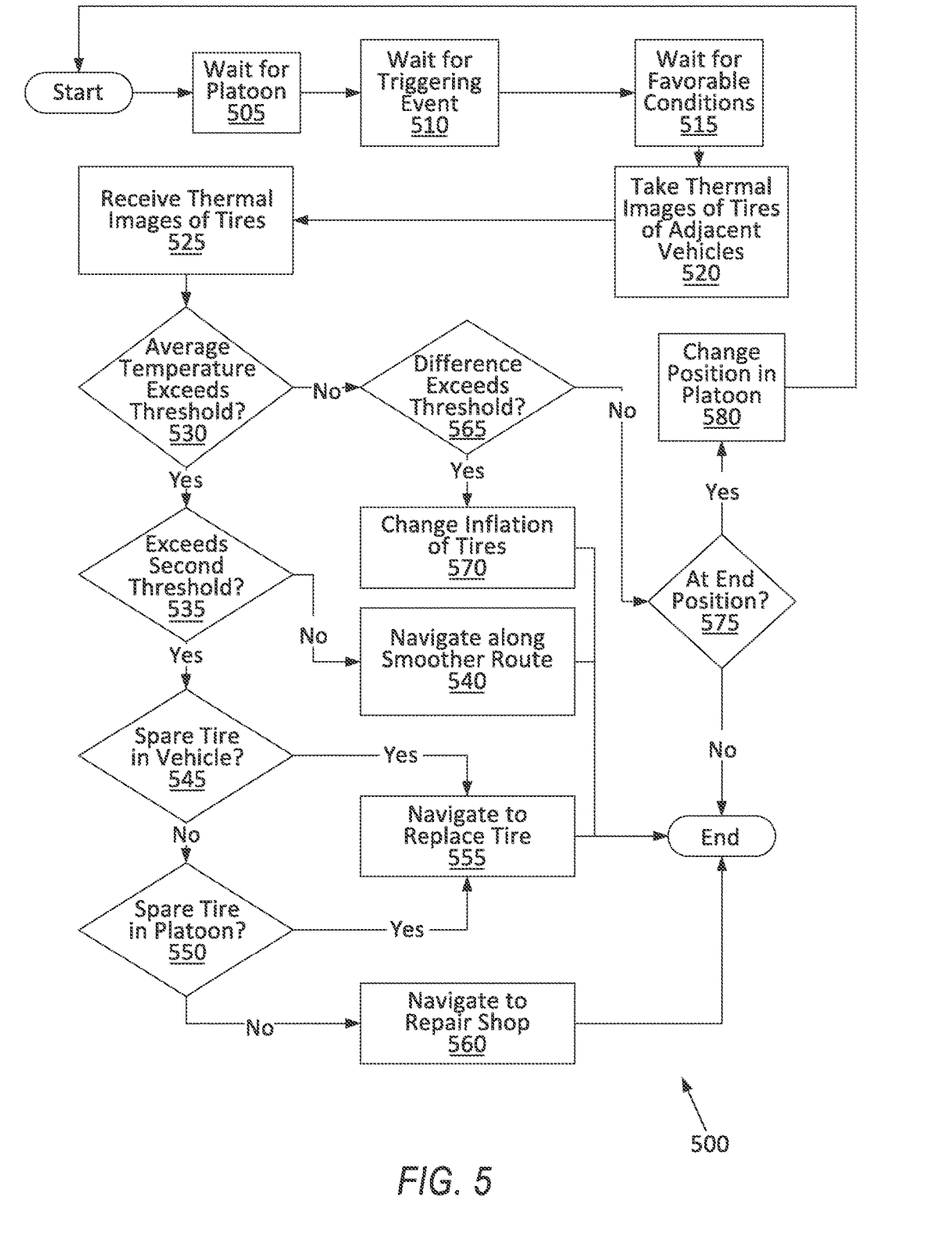
FIG. 5 is a process flow diagram of an exemplary process for testing tires of the exemplary vehicle of FIG. 1.

FIG. 5 is a process flow diagram illustrating an exemplary process 500 for testing tires 40 of the first vehicle 30 when the first vehicle 30 is in the platoon 34. The computer 36 may be programmed to carry out the steps of the process 500. Computers associated with other vehicles 32, 38 in the platoon 34 may carry out the same process concurrently.

The process 500 begins in a block 505. In the block 505, the computer 36 determines that the first vehicle 30 and the second vehicle 32 are in the platoon 34 without an intervening vehicle, that is, a vehicle between the first vehicle 30 and the second vehicle 32. The computer 36 may designate a vehicle adjacently in front or behind the first vehicle 30 as the second vehicle 32, thus ensuring no intervening vehicles between the first vehicle 30 and the second vehicle 32.

Next, in a block 510, the computer 36 waits for a triggering event. A triggering event is an event after which the computer 36 will request a thermal image of the tire 40. Examples of triggering events include a low-pressure warning about the tire 40 from the first vehicle 30, a signal from another vehicle 32, 38 in the platoon 34, a position change among the vehicles 30, 32, 38 in the platoon 34, a mileage threshold surpassed since the last test of the tires 40, etc. Once the triggering event occurs, the process 500 continues.

Next, in a block 515, the computer 36 waits for conditions favorable for testing the tires 40. The required conditions may be chosen to allow the thermographic cameras 58 to have a sufficiently clear and steady view of the tires 40. For example, the conditions may include that the surrounding area is dry, dark, or both; that the vehicles 30, 32 are traveling on a straight road for at least a preset minimum duration; that the inflation pressure has reached a plateau pressure. The preset minimum duration may be chosen to allow each thermographic camera 58 sufficient time to take a thermal image of a corresponding tire 40. The plateau pressure is a pressure that the tires 40 reach during operation, i.e., after the tires 40 have heated from a cold, non-operating condition, after which the pressure does not substantially change. The plateau pressure may be determined experimentally. Alternatively, the duration to reach the plateau pressure may be determined experimentally, and operating the first vehicle 30 for at least the duration to reach the plateau pressure may be a condition. Once the favorable conditions have occurred, the process 500 continues.

Next, in a block 520, the computer 36 instructs the thermographic camera 58 of the first vehicle 30 to take a thermal image of one of the tires 40 of the second vehicle 32. Substantially simultaneously but outside of the process 500, the thermographic camera 58 of the second vehicle 32 takes a thermal image of one of the tires 40 of the first vehicle 30. Thermographic cameras 58 of each of the vehicles 30, 32, 38 in the platoon 34 may take thermal images of the tires 40 of adjacent vehicles 30, 32, 38.

Next, in a block 525, the computer 36 receives a thermal image of one of the tires 40 of the first vehicle 30 from the second vehicle 32, via the transmitter 56. The computer 36 may also transmit the thermal image of the tire 40 of the second vehicle 32 to the second vehicle 32 through the transmitter 56.

Next, in blocks 530-570, each of which are described in detail below following the overview provided in this paragraph, the computer 36 determines whether the thermal image exceeds one or more thresholds and navigates a route for the first vehicle 30 based upon determining that the thermal image exceeds one or more thresholds. The computer 36 checks the thermal image against thresholds in decision blocks 530 and 565. The computer 36 navigates routes based upon determining that the thermal image exceeds one of the thresholds in blocks 540, 555, 560, and 570.

After the block 525, in the decision block 530, the computer 36 determines whether the thermal image exceeds a first threshold by determining whether an average temperature across the width W of the tire 40 exceeds the first threshold. The first threshold is a temperature. The computer 36 may select an array of points across the width W of the tire 40 in the image where the tire 40 is in contact with the road, for example, seven points spaced evenly between the shoulders 48. The computer 36 may take an average, that is, an arithmetic mean, of the points to determine the average temperature across the width W of the tire 40. For each type of tire 40, an experimentally determined correlation exists between the average temperature and the wear of the tire 40. The computer 36 compares the average temperature with the first threshold. If the average temperature is below the first threshold, the process 500 proceeds to a decision block 565.

If the average temperature is above the first threshold, next, in a decision block 535, the computer 36 determines whether the average temperature across the width W of the tire 40 exceeds a second threshold. The second threshold is a temperature. The second threshold may vary with a distance remaining in an originally planned route. The originally planned route may have been determined before the platoon 34 began traveling as an intended route that the first vehicle 30 and/or the platoon 34 would follow between a starting location and a destination. The second threshold may be chosen to set an acceptably low likelihood that the type of tire 40 will fail within a known distance, e.g., the distance remaining in the originally planned route. If the average temperature across the width W of the tire 40 exceeds the second threshold, the process 500 proceeds to a decision block 545.

If the average temperature across the width W of the tire 40 is below the second threshold, next, in a block 540, the computer 36 determines a replacement route from the current location of the first vehicle 30 to the destination of the originally planned route. The replacement route is chosen to have smoother roads than the originally planned route. The computer 36 may receive smoothness scores for lengths of roads included along with map information. A "smoothness score" is a measure of how rough or smooth a stretch of road is. Data determining smoothness scores may have been gathered by other vehicles passing over the road via, e.g., suspension systems of the vehicles. The data may include, e.g., bumpiness or number of potholes encountered. The smoothness scores may be based on, e.g., frequency and amplitude of shocks experienced by the suspension systems of the vehicle passing over the stretch of road. After the block 540, the process 500 ends.

If the average temperature across the width W of the tire 40 exceeds the second threshold, after the decision block 535, in a decision block 545, the computer 36 determines whether the first vehicle 30 has a spare tire on board. If the tires 40 are equipped with tire-pressure monitoring systems (TPMSs) or radio frequency identification (RFID) transponders, the computer 36 may count the number of signals from TPMSs or RFID transponders. If the computer 36 detects five signals, then the first vehicle 30 has a spare tire; if the computer 36 detects four signals, then the first vehicle 30 does not have a spare tire. If the computer 36 determines that the first vehicle 30 has a spare tire, the process 500 proceeds to a block 555.

If the computer 36 determines that the first vehicle 30 does not have a spare tire, next, in a decision block 550, the computer 36 transmits a request for a spare tire to nearby vehicles, e.g., the other vehicles 32, 38 in the platoon 34, and determines whether any of the other vehicles 32, 38 answer affirmatively. If the none of the other vehicles 32, 38 in the platoon 34 has a spare tire, the process 500 proceeds to a block 560.

After the decision block 545 if the first vehicle 30 has a spare tire or after the decision block 550 if another vehicle 32, 38 in the platoon 34 has a spare tire, in the block 555, the computer 36 navigates to replace the tire 40 exceeding the second threshold with the spare tire. If a human operator is in the platoon 34, then the first vehicle 30, the vehicle carrying the spare tire (if applicable), and the vehicle carrying the human operator (if a separate vehicle) all pull over to the side of the road to allow the human operator to replace the tire 40 exceeding the second threshold with the spare tire. If the platoon 34 does not have a human operator, then the first vehicle 30 and the vehicle carrying the spare tire (if applicable) may navigate to a service station or repair shop for replacement of the tire 40 exceeding the second threshold with the spare tire. After the block 555, the process 500 ends.

After the decision block 550, if none of the vehicles 32, 38 in the platoon 34 have a spare tire, in the block 560, the computer 36 navigates to a service station or a repair shop to acquire a spare tire and have the tire 40 exceeding the second threshold replaced with the spare tire. After the block 560, the process 500 ends.

After the decision block 530, if the average temperature is below the first threshold, in the decision block 565, the computer 36 determines whether the thermal image exceeds a third threshold by determining whether a temperature difference between the shoulder 48 and the midpoint 52 along the width W of the tire 40 exceeds the third threshold. The third threshold is a temperature difference, measured in units of temperature, e.g., degrees Celsius. The computer 36 may select points in the image at the midpoint 52 and at the shoulders 48 where the tire 40 contacts the road, and the computer 36 measures the temperatures at the points. The computer 36 then measures the differences in temperature between the temperature at each shoulder 48 and the temperature at the midpoint 52, and the computer 36 determines whether either difference exceeds the third threshold. Alternatively or additionally, the computer 36 may select an array of points across the width W of the tire 40 in the image where the tire 40 is in contact with the road, for example, seven points spaced evenly between the shoulders 48. The computer 36 then measures the greatest difference in temperature between the points not on the midpoint 52 and the point at the midpoint 52; the computer 36 then compares that difference to the third threshold. Alternatively or additionally, the third threshold may differ depending on whether the temperature at the midpoint 52 is higher or lower than the temperature at the shoulder 48 or at the extreme point not on the midpoint 52. If the thermal image does not exceed the third threshold, the process 500 proceeds to a decision block 575.

If the thermal image exceeds the third threshold, next, in the block 570, the computer 36 navigates the first vehicle 30 to change the inflation pressure of the tire 40 exceeding the third threshold. If a human operator is in the platoon 34, then the first vehicle 30 and the vehicle carrying the human operator (if a separate vehicle) pull over to the side of the road to allow the human operator to add inflation medium to the tire 40 or bleed inflation medium from the tire 40. If the platoon 34 does not have a human operator, then the first vehicle 30 may navigate to a service station or repair shop to add inflation medium to the tire 40 or bleed inflation medium from the tire 40. Alternatively or additionally, the vehicle 30 may be equipped to automatically inflate or deflate the tires 40. After the block 570, the process 500 ends.

If the thermal image does not exceed the third threshold, after the decision block 565, in the decision block 575, the computer 36 determines whether the first vehicle 30 is at an end position of the platoon 34, in other words, whether the first vehicle 30 is the leading vehicle or the last vehicle in the platoon 34. If the first vehicle 30 was the leading vehicle of the platoon 34, then no thermal images were taken of the front tires 40 of the first vehicle 30. If the first vehicle 30 was the last vehicle of the platoon 34, then no thermal images were taken of the back tires 40 of the first vehicle 30. If the first vehicle 30 is not at an end position of the platoon 34, then the process 500 ends.

If the first vehicle 30 is at an end position of the platoon 34, next, in a block 580, the computer 36 transmits a request for a change in relative position within the platoon 34. Upon the change in relative position, the process 500 restarts so that the first vehicle 30 may receive thermal images of the tires 40 for which the first vehicle 30 did not previously receive images. The change in relative position may serve as a triggering event in the block 510.

Figure 6:
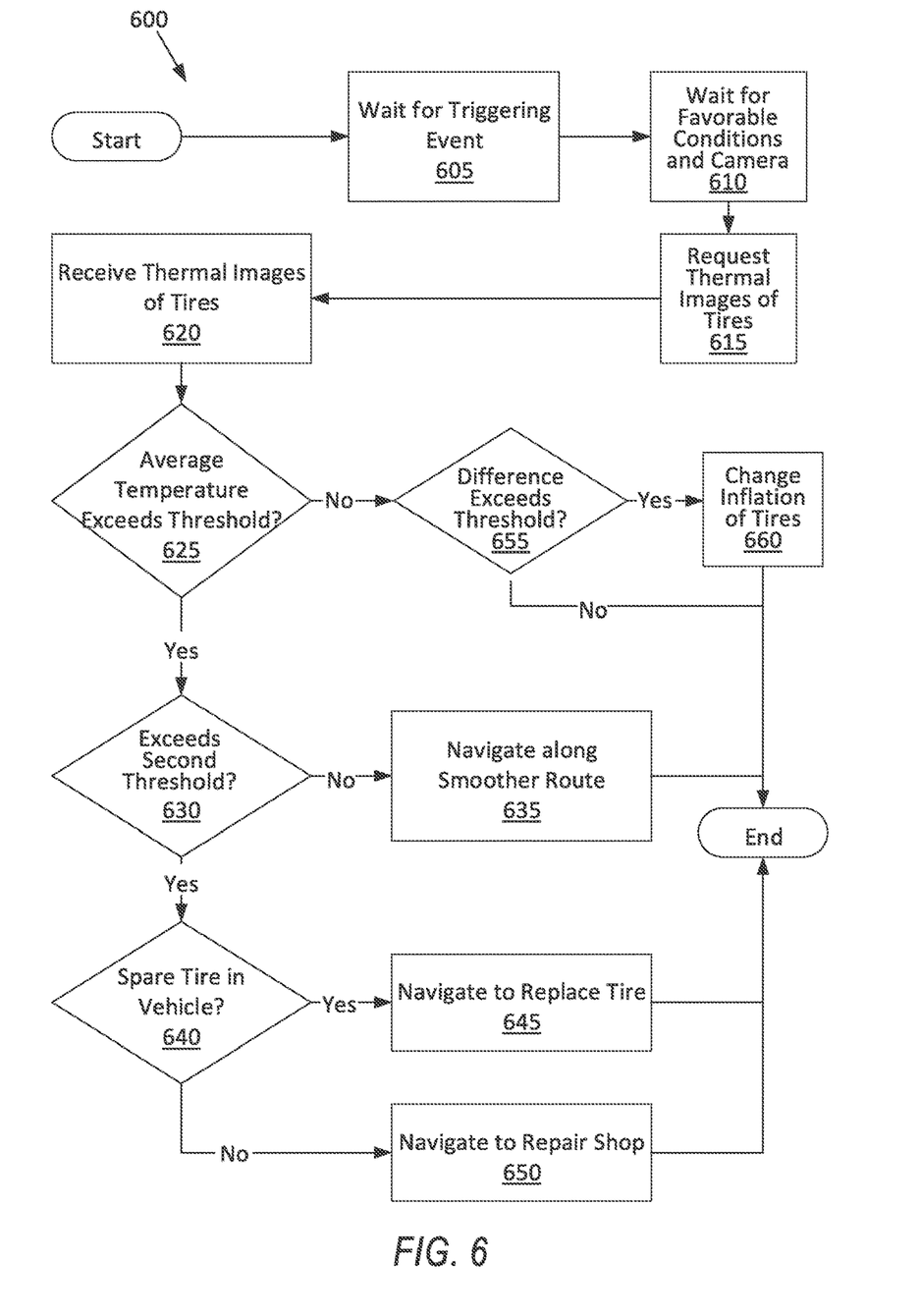
FIG. 6 is a process flow diagram of a second exemplary process for testing tires of the exemplary vehicle of FIG. 1.

FIG. 6 is a process flow diagram illustrating an exemplary process 600 for testing tires 40 of the first vehicle 30 when the first vehicle 30 is not necessarily part of the platoon 34. The computer 36 may be programmed to carry out all the steps of the process 600.

The process 600 begins in a block 605. In the block 605, the computer 36 waits for a triggering event, as described above with respect to the block 510.

Next, in a block 610, the computer 36 identifies an apparatus having a thermographic camera 58 facing a tire 40 of the first vehicle 30 while waiting for conditions favorable for testing the tires 40. The apparatus may be, e.g., the drone 60 or a component of infrastructure such as the stoplight 62. The required conditions may be chosen to allow the thermographic camera 58 to have a sufficiently clear and steady view of the tires 40. For example, the conditions may include that the surrounding area is dry, dark, or both; that the first vehicle 30 will be stationary for at least a preset minimum duration; that the inflation pressure has reached a plateau pressure. The preset minimum duration may be chosen to allow the thermographic camera 58 sufficient time to take a thermal image of the tire 40. Once the favorable conditions have occurred while the thermographic camera 58 is facing the tire 40, the process 600 continues.

Next, in a block 615, the computer 36 requests a thermal image of the tire 40 from the apparatus via the transmitter 56.

Next, in a block 620, the computer 36 receives the thermal image of one of the tires 40 of the first vehicle 30 from the apparatus via the transmitter 56.

Next, in blocks 625-660, each of which are described in detail below following the overview provided in this paragraph, the computer 36 determines whether the thermal image exceeds one or more thresholds and navigates a route for the first vehicle 30 based upon determining that the thermal image exceeds one or more thresholds. The computer 36 checks the thermal image against thresholds in decision blocks 625 and 655. The computer 36 navigates routes based upon determining that the thermal image exceeds one of the thresholds in blocks 635, 645, 650, and 660. Description of each of the blocks 625-660 is the same as the description above for the corresponding block in the process 500, except that the computer 36 does not determine whether the (not necessarily present) platoon 34 has a spare tire, and the computer 36 does not determine whether the vehicle 30 is in the end position of the platoon 34.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer programmed to:
   determine that a first vehicle and a second vehicle are in a platoon without an intervening vehicle;
   receive a thermal image of a tire of the first vehicle from the second vehicle; and
   navigate a route for the first vehicle based upon determining that the thermal image exceeds a threshold.

2. The computer of claim 1, wherein determining that the thermal image exceeds the threshold includes determining that an average temperature across a width of the tire exceeds the threshold.

3. The computer of claim 1, wherein determining that the thermal image exceeds the threshold includes determining that a temperature difference between a shoulder and a midpoint along a width of the tire exceeds the threshold.

4. The computer of claim 1, wherein the computer is further programmed to request the thermal image of the tire upon determining that a surrounding environment is at least one of dry and dark.

5. The computer of claim 1, wherein the computer is further programmed to request the thermal image of the tire upon determining that the first and second vehicles are traveling on a straight road.

6. The computer of claim 1, wherein the computer is further programmed to request the thermal image of the tire upon determining that the tire has reached a plateau pressure.

7. The computer of claim 1, wherein the computer is further programmed to request the thermal image of the tire upon receiving a low-pressure warning about the tire.

8. The computer of claim 1, wherein the computer is further programmed to determine that the tire needs replacing before completing an originally planned route in response to the thermal image exceeding the threshold.

9. The computer of claim 8, wherein the computer is further programmed to transmit a request for a spare tire to nearby vehicles upon determining that the first vehicle lacks a spare tire.

10. The computer of claim 1, wherein the computer is further programmed to navigate a route having smoother roads than an originally planned route upon determining that the thermal image exceeds the threshold.

11. The computer of claim 1, wherein the computer is further programmed to transmit a request for a change in a relative position within the platoon, and upon changing the relative position, request the thermal image of the tire.

12. The computer of claim 1, wherein the computer is further programmed to instruct a thermographic camera of the first vehicle to take a thermal image of a tire of the second vehicle.

13. A computer programmed to:
    identify an apparatus having a thermographic camera facing a tire of a vehicle;
    request a thermal image of the tire from the apparatus; and
    navigate a route for the vehicle upon determining that the thermal image exceeds a threshold.

14. The computer of claim 13, wherein determining that the thermal image exceeds the threshold includes determining that an average temperature across a width of the tire exceeds the threshold.

15. The computer of claim 13, wherein determining that the thermal image exceeds the threshold includes determining that a temperature difference between a shoulder and a midpoint along a width of the tire exceeds the threshold.

16. A method comprising:
    determining that a first vehicle and a second vehicle are in a platoon without an intervening vehicle;
    receiving a thermal image of a tire of the first vehicle from the second vehicle; and
    navigating a route for the first vehicle upon determining that the thermal image exceeds a threshold.

17. The method of claim 16, wherein determining that the thermal image exceeds the threshold includes determining that an average temperature across a width of the tire exceeds the threshold.

18. The method of claim 16, wherein determining that the thermal image exceeds the threshold includes determining that a temperature difference between a shoulder and a midpoint along a width of the tire exceeds the threshold.

19. The method of claim 16, further comprising determining that the tire needs replacing before completing an originally planned route in response to the thermal image exceeding the threshold.

20. The method of claim 16, further comprising navigating a route to having smoother roads than an originally planned route upon determining that the thermal image exceeds the threshold.

* * * * *